(12) United States Patent
Lee (10) Patent No.: US 8,086,225 B2
(45) Date of Patent: Dec. 27, 2011

(54) METHODS AND APPARATUS FOR CONTROLLING THE OPERATION OF WIRELESS COMMUNICATIONS SYSTEMS

(75) Inventor: Wayne S. Lee, San Mateo, CA (US)

(73) Assignee: Panasonic Corporation, Osaka (JP)

( * ) Notice: Subject to any disclaimer, the term of this patent is extended or adjusted under 35 U.S.C. 154(b) by 1028 days.

(21) Appl. No.: 11/876,075

(22) Filed: Oct. 22, 2007

(65) Prior Publication Data

US 2009/0104900 A1      Apr. 23, 2009

(51) Int. Cl.
*H04M 3/20* (2006.01)
(52) U.S. Cl. .... 455/418; 455/86; 455/552.1; 455/553.1; 455/102; 711/101
(58) Field of Classification Search .......... 455/418, 455/552.1, 553.1, 575.7, 102, 86, 550.1; 711/101
See application file for complete search history.

(56) References Cited

U.S. PATENT DOCUMENTS

| 6,484,014 | B1* | 11/2002 | Koszarsky | 455/86 |
| 7,242,912 | B2* | 7/2007 | Maligeorgos et al. | 455/88 |
| 7,272,413 | B2* | 9/2007 | Yu | 455/552.1 |
| 7,437,136 | B2* | 10/2008 | Karr | 455/296 |
| 2002/0151287 | A1* | 10/2002 | Lindquist et al. | 455/183.1 |
| 2005/0245199 | A1* | 11/2005 | Batra et al. | 455/73 |
| 2006/0015674 | A1* | 1/2006 | Murotake | 711/101 |
| 2006/0035619 | A1* | 2/2006 | Hallivuori et al. | 455/333 |
| 2007/0015472 | A1* | 1/2007 | Murtojarvi et al. | 455/102 |
| 2007/0225034 | A1* | 9/2007 | Schmidt | 455/552.1 |
| 2008/0012628 | A1* | 1/2008 | Bushman et al. | 327/538 |
| 2008/0048793 | A1* | 2/2008 | Koerner | 331/109 |
| 2008/0207131 | A1* | 8/2008 | Coersmeier | 455/62 |
| 2009/0042527 | A1* | 2/2009 | Niknejad | 455/234.2 |

* cited by examiner

*Primary Examiner* — Kamran Afshar
*Assistant Examiner* — Mong-Thuy Tran (57) ABSTRACT

Methods and apparatus for controlling events, timing and operational characteristics of wireless communications devices. An exemplary wireless communications apparatus comprises a baseband processor, radio frequency (RF) generating circuitry, a programmable event controller, and a memory device. The RF generating circuitry and programmable event controller are integrated in the same integrated circuit. The memory device, which may also be embedded in the same integrated circuit as the event controller and RF generating circuitry, is configured to store a sequence of instructions the event controller executes in response to a baseband command. The memory device is also configured to store control parameter data, which the event controller retrieves and uses to enable, disable, select and deselect various devices on the integrated circuit and to set, adjust or modify the operational characteristics of the RF generating circuitry (e.g., band selection and tuning) and other circuitry (e.g., power control circuitry) of the communications apparatus.

31 Claims, 8 Drawing Sheets

METHODS AND APPARATUS FOR CONTROLLING THE OPERATION OF WIRELESS COMMUNICATIONS SYSTEMS

FIELD OF THE INVENTION

The present invention relates to wireless communications. More specifically, the present invention relates to methods of and apparatus for controlling events, timing and other operational characteristics of wireless communications systems.

BACKGROUND OF THE INVENTION

Wireless communications systems are ubiquitous in today's world. Cellular telephones and wireless personal digital assistants (PDAs) configured in cellular networks provide mobility and afford users the ability to communicate over vast distances without the obtrusiveness and physical limitations presented by wired communications systems. Laptop computers equipped with wireless network interface cards in wireless local area networks (WLANs), and peripheral devices such as wireless keyboards and wireless mice configured in wireless personal area networks (WPANs), also provide users with greater mobility and freedom of movement compared to wired networking approaches.

Figure 1:
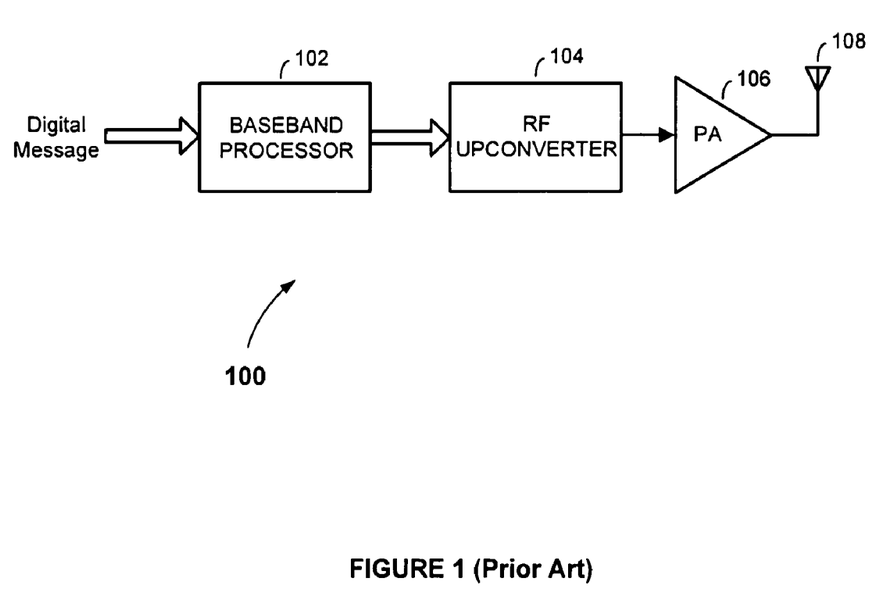
FIG. 1 is a simplified block diagram of a typical prior art wireless communications transmitter.

FIG. 1 is a simplified block diagram of a typical prior art radio frequency (RF) wireless communications transmitter 100. The communications transmitter 100 includes a baseband processor 102, an RF upconverter 104, a power amplifier 106, and an antenna 108. These components are common to most every modern RF transmitter, whether the transmitter is designed for use in a WLAN, a WPAN or a wide area network (WAN) such as a cellular communications network. The baseband processor 102 operates to generate modulation data from an incoming digital message. The RF upconverter 104 uses modulation data to modulate an RF carrier signal. The modulated RF carrier signal is then amplified by the PA 106 and radiated by the antenna 108 to a remote receiver.

Figure 2:
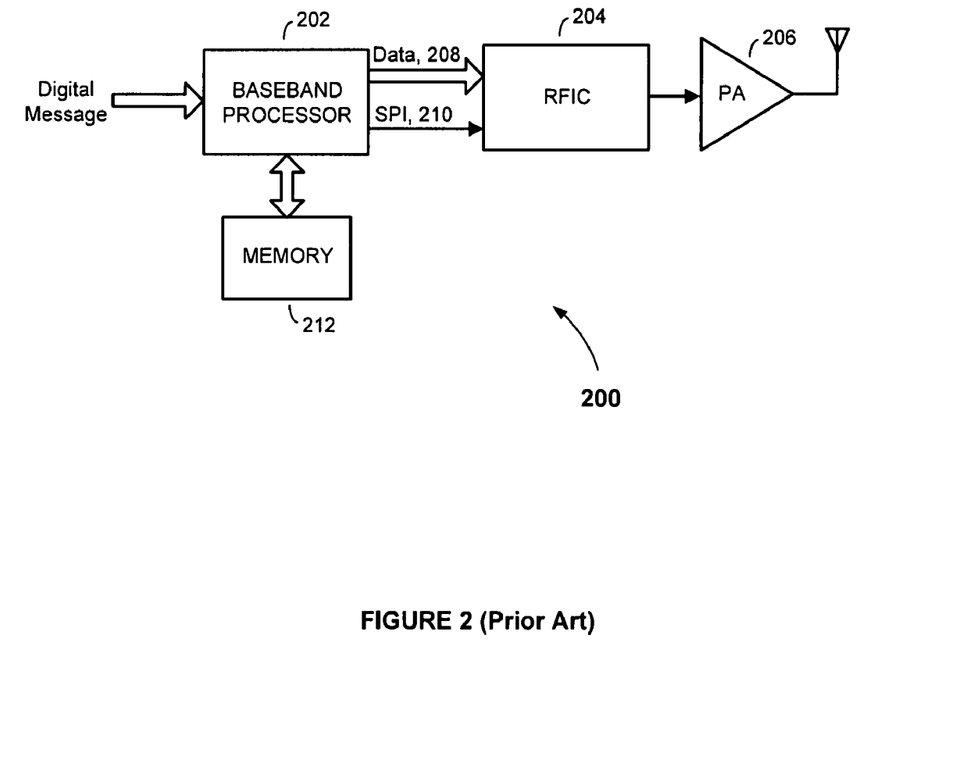
FIG. 2 is a simplified block diagram of a typical prior art wireless communications transmitter implemented using a baseband processor and a radio frequency integrated circuit (RFIC)

To reduce size and conserve power, the various components of the RF transmitter 100 are often implemented in the form of several integrated circuits (ICs). Typically, as shown in FIG. 2, the baseband processor is implemented in a first IC 202, while the upconverter 104 and PA 106 are formed in second and third ICs 204 and 206. The upconverter 104, in particular, is normally integrated with other analog components on second IC 204, which is commonly referred to in the art as the "RFIC" 204.

Modulation data generated by the baseband IC 202 is provided to the RFIC 204 over a data bus 208. A control interface 210 is also included between the baseband IC 202 and RFIC 204, to provide a means over which the baseband IC 202 can control events and timing of the RFIC 204, and to provide a means for sending control parameters that set or adjust the operation of components on the RFIC 204. Unfortunately, this control mechanism is slow since the control signals and control parameter data must be sent from one chip to another. Delays also result if the control parameter data must be first retrieved from off-chip memory before it is sent over the interface 210 to the RFIC 204. All of these delays in control are exacerbated by the fact that the control interface 210 is usually, for historical reasons, implemented as a serial interface (often referred to in the art as a serial port interface (or "SPI")).

Delays in control are undesirable since they result in transmission delays. While transmission delays may be tolerable in some low speed applications, in others they are not, particularly in wideband applications that have corresponding high data rates. Delays can also be particularly problematic in transceiver technologies requiring a high degree of control and calibration such as, for example, polar modulation transmitters.

It would be desirable, therefore, to have methods and apparatus for controlling events and operational characteristics of wireless communications systems which avoid the control and transmission delay problems experienced by prior art wireless communication systems.

SUMMARY OF THE INVENTION

Methods and apparatus for controlling events, timing and operational characteristics of wireless communications devices are disclosed. An exemplary wireless communications apparatus comprises a baseband processor, radio frequency (RF) generating circuitry, a programmable event controller, and a memory device. The RF generating circuitry and programmable event controller are integrated in the same integrated circuit. The memory device may also be embedded in the same integrated circuit as the event controller and RF generating circuitry. The memory device is configured to store a sequence of instructions which the event controller executes in response to a baseband command (e.g., a tuning command). The memory device is also configured to store control parameter data, which the event controller retrieves and uses to enable, disable, select and deselect various devices on the integrated circuit and to set, adjust or modify the operational characteristics of the RF generating circuitry (e.g., band selection and tuning) and other circuitry (e.g., power control circuitry) of the communications apparatus.

According to one embodiment of the invention the wireless communications apparatus comprises a multi-mode wireless communications apparatus which the event controller is operable to configure according to various frequency bands and various wireless standards used throughout the world. To reduce the memory size requirements of the event controller memory device, a nonvolatile storage device (e.g., a FLASH memory device) coupled to the baseband processor is configured to store a plurality of different sets (or "images") of instructions and band information for different regions of the world (e.g., United States, Japan and Europe). When the communications apparatus is powered ON, only the appropriate image corresponding the region of the world where the apparatus is located is downloaded to the event controller memory device.

The methods and apparatus of the present invention offer a number of advantages over prior art approaches to controlling wireless communications apparatuses. In particular, because only a single baseband command is needed to initiate a sequence of instructions that completely configure the communications apparatus to operate according to desired frequency and power settings, and because the instructions and control parameter data may all be stored on the same integrated circuit as the event controller and RF generating circuitry, delays in configuring the communications apparatus to transmit at the desired frequency and power settings are substantially reduced compared to the delays experienced by prior art wireless communications control apparatuses and methods. Other features and advantages of the present invention will be understood upon reading and understanding the detailed description of the preferred exemplary embodiments, found hereinbelow, in conjunction with reference to the drawings, a brief description of which are provided below.

DETAILED DESCRIPTION

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Figure 3:
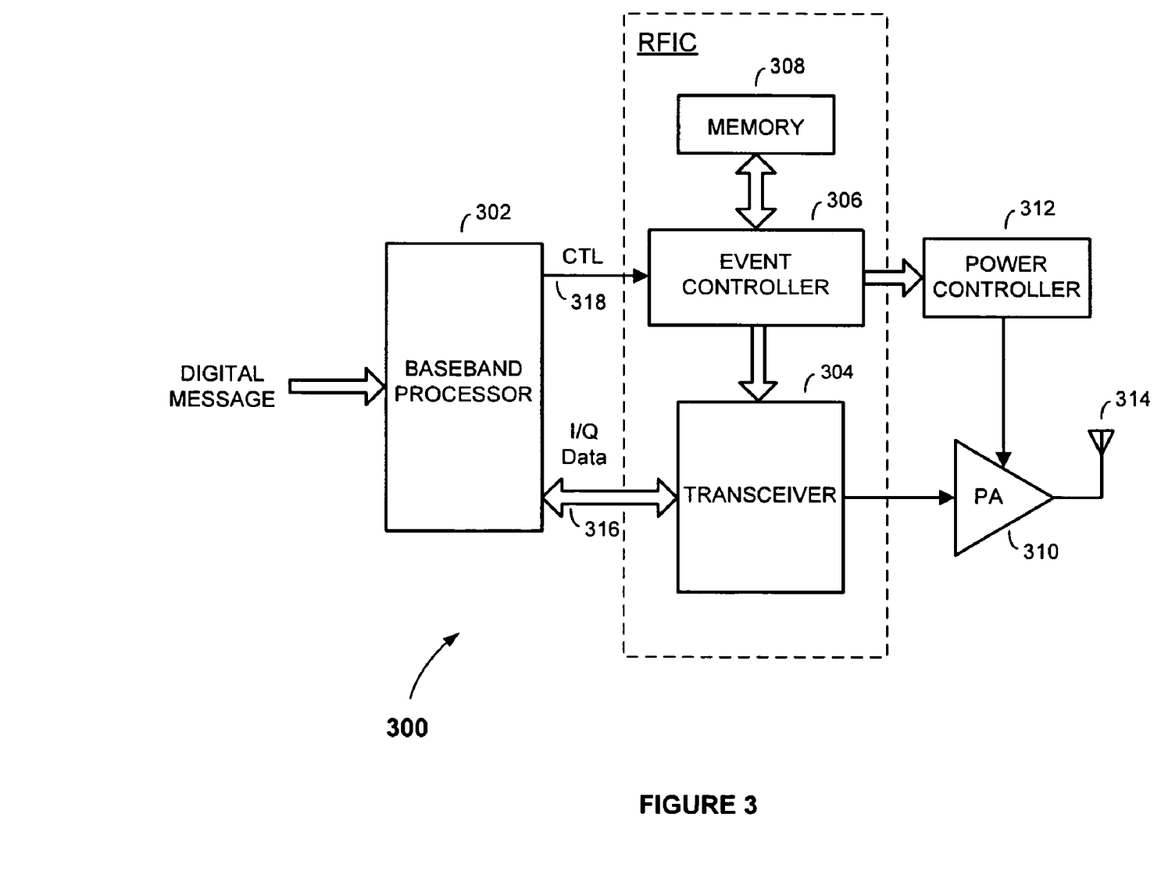
FIG. 3 is a drawing of a wireless communications system that includes an RFIC with an integrated event controller and memory device, according to an embodiment of the present invention.

Referring first to FIG. 3, there is shown a wireless communications system 300, according to an embodiment of the present invention. The wireless communications system 300 comprises a baseband processor 302, a transceiver 304, an event controller 306, a memory device 308, a power amplifier (PA) 310, a power controller 312, and an antenna 314. The baseband processor 302 is configured to receive a digital message and provide in-phase ('I') and quadrature phase ('Q') data signals, over a data bus 316, to the transceiver 304. The baseband processor 302 is further configured to provide control signals over a control interface ('CTL') 318 to the event controller 306. In this exemplary embodiment, the control interface 318 comprises a serial port interface. However, in an alternative embodiment the control interface 318 is a digital parallel interface. As explained in detail below, the event controller 306 comprises a programmable digital controller which initiates or halts execution of instructions influencing the operation and/or control of the transceiver 304, in response to control signals received over the control interface 318. The transceiver 304 modulates an RF carrier tuned to a band specified by the event controller 306 and sends the modulated signal to the PA 310, which amplifies the modulated RF carrier according to power settings specified by the event controller 306. The amplified modulated RF carrier is then radiated over the air by the antenna 314 to a remote receiver.

According to one embodiment of the invention, the control signals sent from the baseband processor 302 over the control interface 318 and to the event controller 306 comprise enable and disable types of commands, which enable or disable the event controller 306, or trigger the event controller 306 to commence or halt performing an instruction or sequence of instructions. According to other embodiments described in more detail below, the control signals further include a few additional basic commands (e.g., tune to frequency X Hz, set power to Y Watts, RF power ON/OFF, etc.), which the event controller 306 responds to in order to set or adjust the operational characteristics of the transceiver 304 in accordance with the specified commands.

Preferably, though not necessarily, the transceiver 304, event controller 306, and memory device 308 are all integrated on the same integrated circuit chip, as indicated by the dashed box labeled "RFIC" in FIG. 3. The power controller 312 may also be integrated on the same RFIC or, as shown, be formed separate from the RFIC. Having the transceiver 304, event controller 306 and memory device 308 all on the same integrated circuit chip provides the event controller 306 with quick access to instructions stored in the memory device 308, as well as tuning, power, gain, modulation and/or calibration parameters (e.g., in the form of one more look up tables (LUTs)), which are also stored in the memory device 308. Because the event controller instructions and control parameter data are stored on the same integrated circuit chip as the transceiver components, delays in transmission caused by sending control information over a chip-to-chip control interface are avoided. Only a few 'master' commands need to be provided by the baseband processor 302 to trigger or disable the operation of the event controller 306, or cause it to perform (or not perform) a certain sequence of instructions.

Because only a few basic master commands need to be transferred from the baseband processor 302 to the RFIC, the systems and methods of the present invention provide a control mechanism that minimizes the complexity of the baseband to RFIC control interface. This, and the fact that the event controller is programmable, allows greater flexibility in making the RFIC compatible with existing baseband processing control subsystems. The programmability aspect of the event controller 306 also allows the event controller instructions to be tailored or modified to provide sequences that accommodate a wider range of existing PA modules. For example, for one type of PA it may be required to tune the VCO before powering up the PA, while for another type of PA it might be necessary to perform these operations in the reverse order. The event controller 306 and on-board memory 308 allow either scenario to be accommodated simply by specifying in the programmed instructions which of the operations should be performed first.

Figure 4:
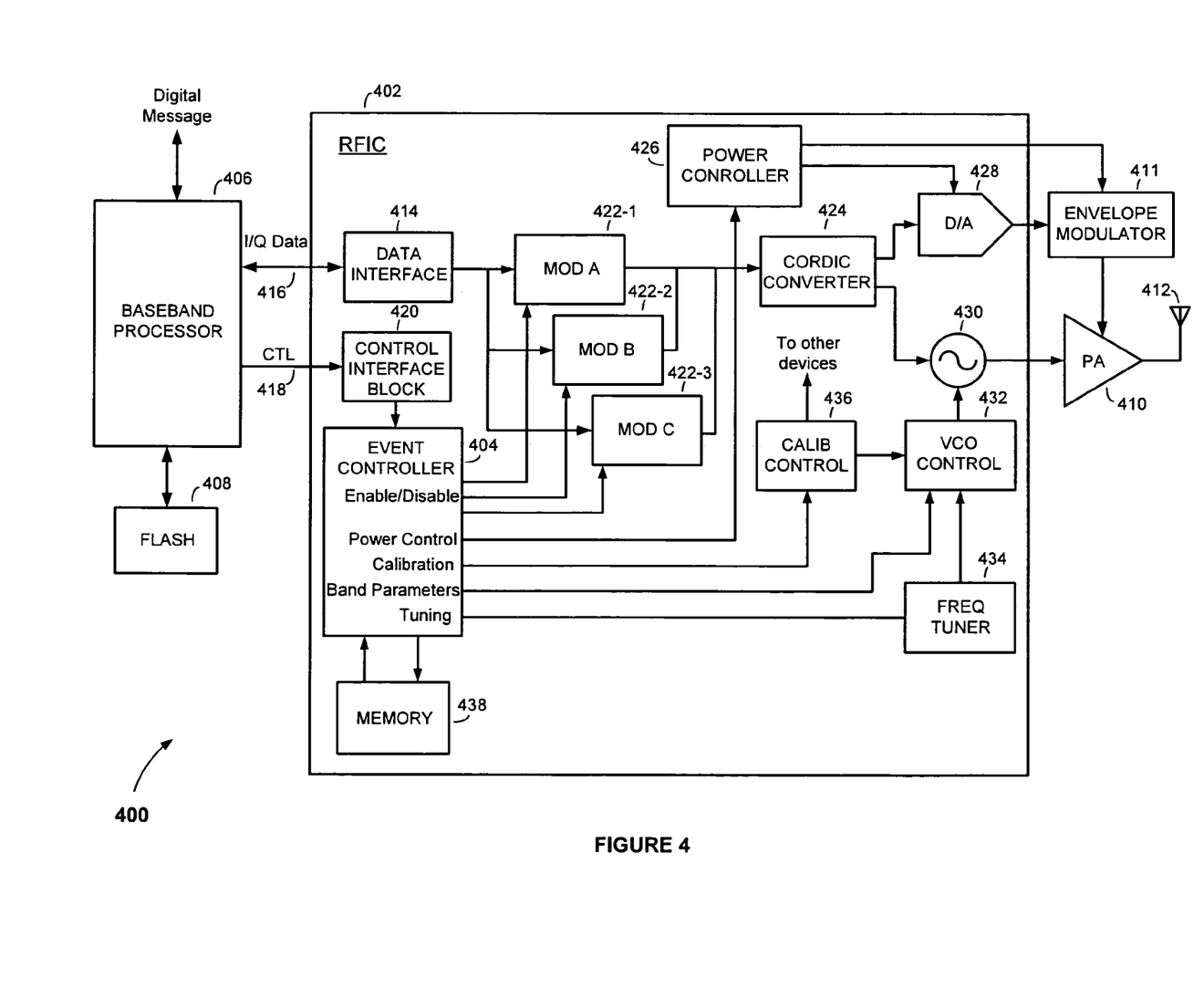
FIG. 4 is a drawing of a polar modulation wireless communications system having an RFIC that includes an integrated event controller and memory device, according to an embodiment of the present invention.

The methods and apparatus of the present invention are applicable to any type of RF transceiver topology. FIG. 4 shows, for example, how they may be used in a polar modulation communications system 400, in accordance with an embodiment of the present invention. The polar modulation communication system 400 comprises an RFIC 402 having an integrated event controller 404; a baseband processor 406; a FLASH memory device 408; a PA 410; an envelope modulator 411; and an antenna 412. Only the transmitter components are shown in the RFIC 402, in order to simplify the description that follows. Those of ordinary skill in the art will readily appreciate and understand, however, that in most circumstances the RFIC 402 will also include receiver components, and that the event controller 404 may also be programmed to control certain receiver events and operations.

Similar to the baseband processor 302 of the wireless communications system 300 in FIG. 3, the baseband processor 406 of the polar modulation communication system 400 generates I-phase and Q-phase data signals from a digital message. The I-phase and Q-phase data signals are conveyed to a data interface block 414 on the RFIC 402, via a data bus 416, and stored in a buffer or registers until the event controller 404 enables the appropriate modulator. Master control signals, similar to those described above in connection with the communications system in FIG. 3, are communicated over a serial control ('CTL") line 418 (or multiple line digital bus, in an alternative embodiment) to a control interface block 420 on the RFIC 402.

In addition to including the event controller 404, the RFIC 402 of the polar modulation communication system 400 further includes one or more modulators 422-1, 422-2 and 422-3; a rectangular-to-polar converter 424 (e.g., a CORDIC (Coordinate Rotation Digital Computer) converter); a power controller 426; a polar modulator including a digital-to-analog converter (D/A) 428 in its envelope path and a voltage controlled oscillator (VCO) 430 in its phase path; a PA 410; a VCO control 432, a frequency tuner 434; a calibration control 436; and a memory 438. As explained below, the event controller 404 of the polar modulation transceiver system 400 is operable to control events, timing and other operational characteristics of the various devices on the RFIC 402.

According to program instructions executed by the event controller 404, the event controller 404 enables, disables, selects, deselects, sets and adjusts devices on the RFIC 402. The control parameters and control signals provided by the event controller 404 comprise digital data and digital control signals. However, in alternative embodiments one or more of the control parameters and control signals may comprise analog data and analog signals.

To select the appropriate modulation technique to be applied to the I/Q data, the event controller 404 executes instructions that include the sending of an enable signal to the appropriate one of the multiple modulators 422-1, 422-2, 422-3 and disable signals to the remaining modulators. To set or adjust the transmission power level at which the PA 410 is to transmit, the event controller 404 is configured to send ON/OFF and power control parameter to the power controller 426. The power controller 426 responds by providing the appropriate digital power control signals to the D/A converter 428 and envelope modulator 411, which in turn provide the appropriate analog power control signal to the power control input of the PA 410.

Band selection and tuning are also performed by the on-chip event controller 404. To set the VCO 430 to the carrier frequency required by the particular wireless standard being employed, the event controller 404 fetches the appropriate band parameters from the memory device 438 and sends them to the VCO control 432. If necessary, the event controller 404 can be further configured to send a tuning command to the frequency tuner 434. The frequency tuner 434 responds to the tuning command by fine tuning the VCO 430 to a particular segment of the frequency band to which the VCO 430 has been coarsely tuned.

Finally, but not necessarily lastly, the event controller 404 may be configured to execute instructions to calibrate various devices on the RFIC, as indicated by the calibration control block in FIG. 4. These calibration events include, for example, calibrating the phase-locked loop and/or gain of the VCO 430, calibrating feedback loops in subsystems on the RFIC 402, and calibrating D/A converters (e.g., the D/A converter 428 in the envelope path of the polar modulator).

Figure 5:
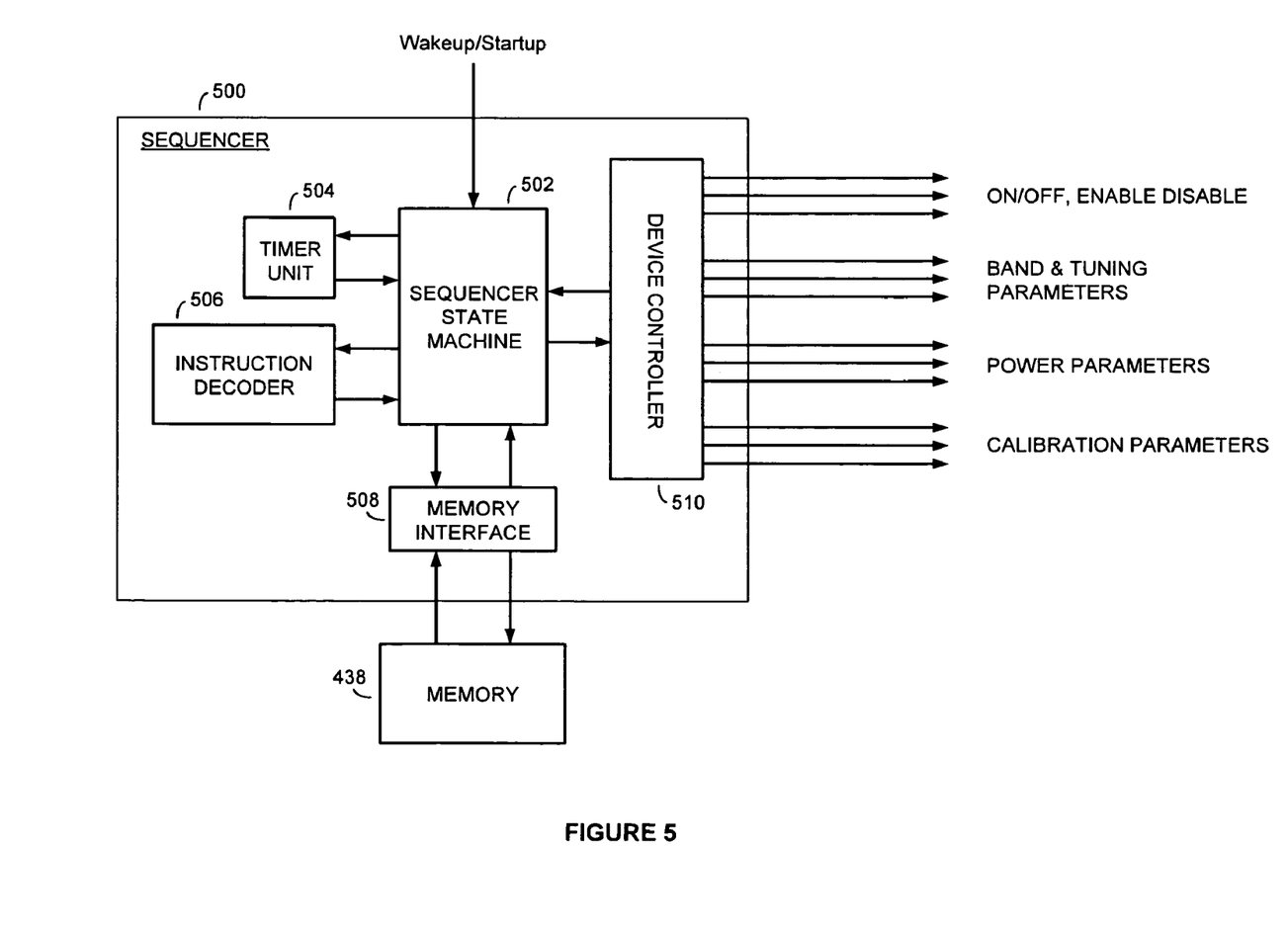
FIG. 5 is a drawing of a sequencer that may be used to implement the event controller in either of the wireless communications systems in FIG. 3 or 4, in accordance with an embodiment of the present invention.

The event controller 404 may be implemented in various ways, including as a microcontroller, a microprocessor, or a sequencer. FIG. 5 is a block diagram illustrating how the event controller 404 may be implemented as a sequencer 500. The sequencer 500 is operable to configure the various devices on the RFIC 402, and some external devices (for example, the PA 410) according to a programmed sequence of instructions. The programmed sequence of instructions are stored in the memory 438 and retrieved and executed by the event controller 404 in response to a master command received from the baseband processor 406. As shown in the drawing, the sequencer 500 comprises a sequencer state machine 502, a timer unit 504, an instruction decoder 506, a memory interface 508, and a device controller 510. The sequencer state machine 502 begins executing instructions upon receipt of a wakeup or startup message (i.e., a master command such as a tuning command, for example) from the baseband processor 406. The sequencer state machine 502 accesses and retrieves the instructions and control parameters from the memory device 438, via the memory interface 508, which are needed to enable, disable, select, deselect, set or adjust the various devices on the RFIC 402. The instruction decoder 506 decodes the instructions and control parameter data. The sequencer state machine 502 then processes the decoded data and transfers the decoded information to the device controller 510. Finally, the device controller 510 applies the control information (e.g., one or more of power ON/OFF, enable/disable, band and tuning parameters, power control parameters, and calibration parameters) to the appropriate devices on the RFIC 402. The timer unit 504 is provided to ensure proper sequencer timing and control, and to ensure that appropriate time spacing between instructions is provided, e.g., in the event that some instructions take longer than others to complete.

According to one embodiment of the invention, the instructions stored in the memory 438, and retrieved and executed by the sequencer 500, each comprises a sixteen-bit (16-bit) digital word. The four (4) most significant bits (MSBs) of each digital word comprise the op code, while the remaining twelve (12) bits comprise the operand containing instruction parameters. The instructions are preferably executed sequentially (although in alternative embodiments they can be performed non-sequentially) and timed and/or delayed by the timer unit 504, as described above. For efficiency and timing precision, instruction parameters for some instructions are designed so that they can be ORed together into a single instruction. For example, an operand bit associated with a particular op code can be reserved exclusively for performing a particular task, while one or more other operand bit(s) can be reserved exclusively for performing one or more other particular task(s). This allows functions associated with a particular opcode to be stacked and executed in parallel rather than serially. For example, an opcode associated with tuning the frequency setting components of the RFIC might have a first operand bit reserved for turning the RFIC's mixer on or off, and a another operand bit reserved for enabling or disabling the VCO. ORing the instructions together allows the mixer and VCO to be enabled and disabled simultaneously (i.e., in parallel) in a single instruction.

Figure 6:
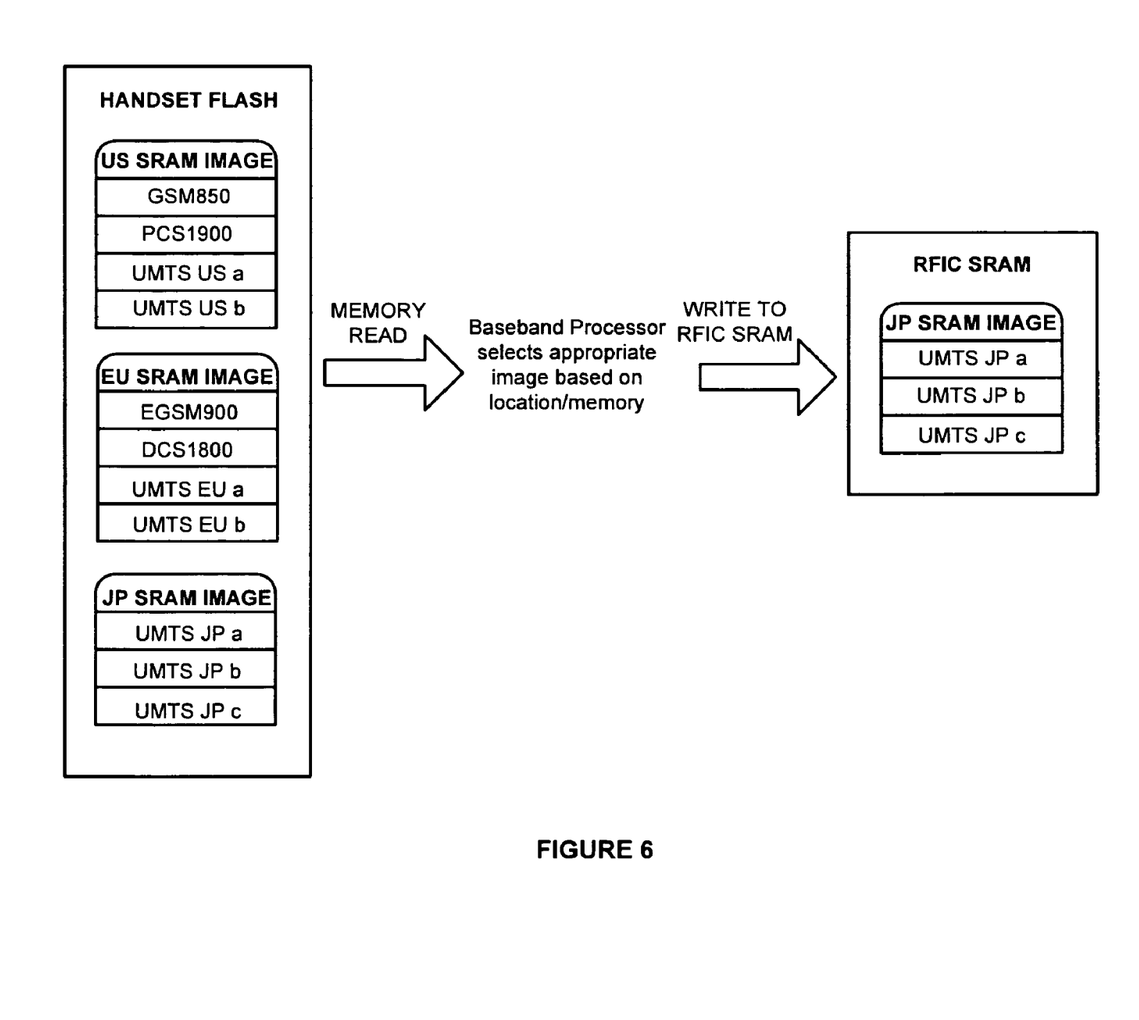
FIG. 6 is a drawing illustrating how multiple images corresponding to multiple regions of the world are stored in a FLASH memory device of a wireless communications device (e.g. a mobile handset), and how one of the images is downloaded to a memory device integrated on the RFIC of the device, according to an aspect of the present invention.

The wireless communications system 300 in FIG. 3 and the polar modulation wireless communications system in FIG. 4 comprise multi-mode communications systems that are configurable to operate in multiple regions of the world, and according to the various frequency bands of the various regions of the world (e.g., the Global System for Mobile (GSM) communications, General Packet Radio Service (GRPS), Enhanced Data rates for GSM Evolution (EDGE), and the Universal Mobile Telecommunications System (UMTS) bands and standards). According to one aspect of the present invention, multiple sequencer images are stored in a FLASH memory device 408, one for each of the various regions of the world (e.g., United States, Europe and Japan), and only the applicable sequencer image is ever stored in the on-chip memory device 438 at any given time. FIG. 6 illustrates, for example, how multiple images for the United States ("US SRAM IMAGE"), Europe ("EU SRAM IMAGE)" and Japan ("JP SRAM IMAGE") are stored in the FLASH memory device 408. Each image contains band selection, tuning and power control data for the different wireless standards and operating bands applicable to the respective different regions of the world. When the wireless communications system is powered ON in a particular world region, the baseband processor determines which band is used in that region and downloads the appropriate image to the RFIC memory 438, for example, via the CTL interface 418. In this manner the wireless communications system can support the various bands of all the various regions of the world without requiring an excessively large amount of on-chip memory 438.

In most circumstances, when the wireless communications system is powered ON it will be operating in a region with the same band profile as the band profile that was being used the last time the device was powered OFF. Given this fact, an index of the last used image can be stored in a non-volatile register (e.g., in the FLASH memory device 408) when the device is powered OFF. Using the stored index reduces the amount of time needed to determine which image to download when the device is next powered ON. It should be mentioned here that, while the approach of controlling on-chip memory just described is desirable in many instances, in alternative embodiments where on-chip memory size is not an unavoidable constraint, the on-chip memory device 438 may be configured to store the band profiles and sequencer instructions of all world regions at the same time. To directly avoid on-chip memory size constraints, in yet another embodiment the memory device 438 is implemented off-chip (i.e., not on the RFIC) as a separate integrated circuit memory chip.

Figure 7:
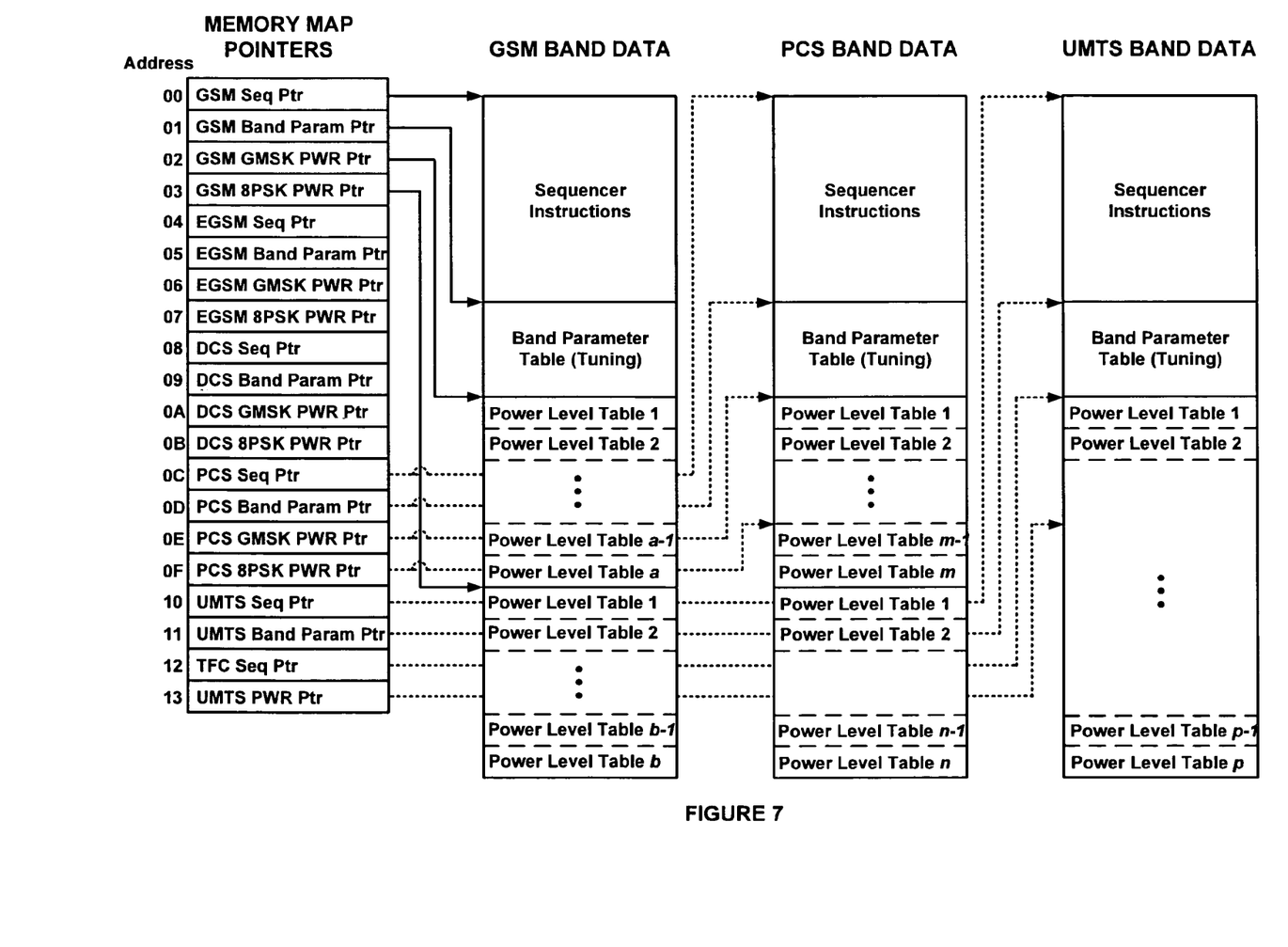
FIG. 7 is a drawing illustrating how indirection pointers (or "memory map pointers") are stored at lower address locations in the sequencer memory, and provide start addresses of various band sections containing band and power data for the wireless communications systems in FIGS. 3 and 4.

Images downloaded into the memory 438 can be organized in a number of ways. According to one embodiment, the memory 438 is divided into different sections, one section per band, and each band section is assigned different areas for sequencer instructions, tuning parameter tables, power level correction tables, index lookup tables, etc. As illustrated in FIG. 7, indirection pointers (or "memory map pointers") are stored at the lower addresses of the memory 438, and are used by the sequencer 500 to determine the start address of the relevant band section. For example, the indirection pointers stored at addresses 00, 0C and 10 of the exemplary memory space in FIG. 7 point to the starting addresses of the sequencer instructions for the GSM, Personal Communications Service (PCS) and UMTS band sections. The sequencer 500 determines the applicable band pointer to use based on band selection bits provided by a tuning command received from the baseband processor or from another frequency data source (e.g., from frequency data already stored somewhere on the RFIC 402).

Once the appropriate image has been downloaded to the memory 438 on the RFIC 402, the sequencer 500 is in a condition in which it can begin retrieving the appropriate instructions and control parameter data from the memory 438, to enable, disable, select, deselect, set or adjust the various devices on the RFIC 402. According to one embodiment of the invention, the sequencer 500 starts these processes only after a tuning command is received from the baseband processor 406. Once triggered, the sequencer 500 executes the appropriate sequence of instructions in its entirety, after which it returns to an idle state in wait of a subsequent tuning command.

Figure 8:
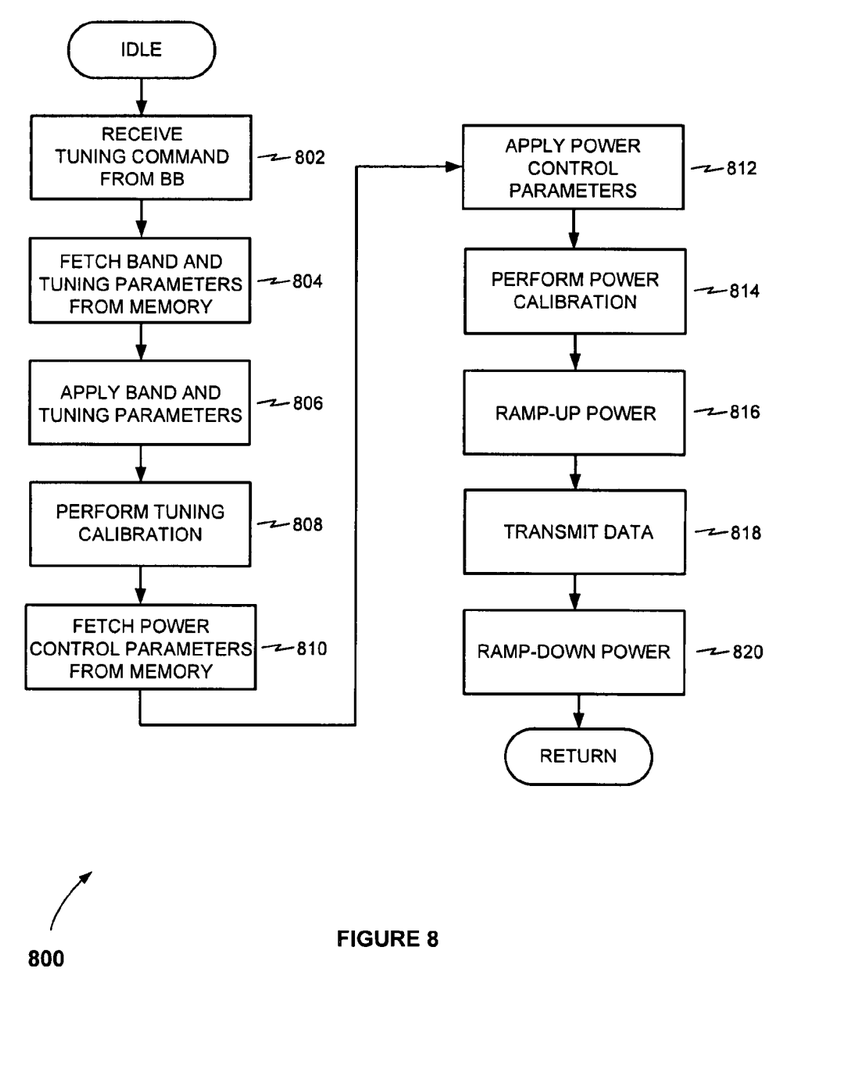
FIG. 8 is a flowchart illustrating a salient sequence of instructions performed by the sequencer and RFIC in FIGS. 4 and 5, in response to receiving a tuning command from the baseband processor, according to an embodiment of the present invention.

FIG. 8 is a flowchart illustrating an exemplary method 800 performed by the sequencer 500 and RFIC 402, in response to a tuning command received from the baseband processor 406, according to an embodiment of the present invention. The salient steps in the method 800 are shown and described in a particular order. Those of ordinary skill in the art will understand, however that the order may be varied and that some of the steps may not be necessary in some situations or applications. In the description of the method 800 that follows, it is assumed that the appropriate sequencer image has already been downloaded to the memory device 438 and that the sequencer 500 is in an idle state awaiting a tuning command from the baseband processor 406.

First, at step 802, the sequencer 500 receives a tuning command from the baseband processor 406. The tuning command triggers the sequencer 500 to awaken from its idle state and commence performing the sequence instructions stored in the memory 438.

The first instructions the sequencer executes involve setting the carrier frequency of the frequency determining components on the RFIC 402 to the frequency specified in the tuning command. Accordingly, at step 804 the sequencer state machine 502 of the sequencer 500 begins retrieving (i.e., "fetching") instructions and band and tuning parameter data from the memory device 438. In this and the steps that follow, the instruction decoder 506 decodes the retrieved instructions and parameter data. The sequencer state machine 502 then processes the decoded instructions and parameter data and conveys certain control parameters to the device controller 510, which applies the control parameter data and control signals to the appropriate devices on the RFIC 402. Accordingly, at step 806 in which the band and tuning parameters are applied, the device controller 510, as controlled by the sequencer state machine 502, sends decoded band and tuning parameter data to the VCO control 432 and frequency tuner 434. The VCO control 432 and frequency tuner 434 use the band and tuning parameter data to set and tune the VCO 430 to the specified carrier frequency.

At step 808 the sequencer executes instructions and retrieves tuning calibration data from the memory 438. This step 808 is optional and is usually only performed if the frequency determining devices on the RFIC 402 require calibration. For example, in some circumstances the loop parameters or loop gain of the VCO's phase-locked loop (PLL) may need to be calibrated. It is at this step that such calibration would be performed.

Next, at step 812 the sequencer 500 executes instructions and retrieves power control data from the memory 438. The power control data includes power ramping profile information and power level settings to be applied to the individual stages of the different amplifier stages of the PA 410, so that the PA 410 may be configured to operate at the power level appropriate for or specified by the band and/or wireless standard being employed. An optional power calibration process is also performed at step 814. It may be applied, for example, if power setting or power control devices on the RFIC 402 need to be calibrated, e.g., in order to comply with power requirements of a particular wireless standard.

Next, at step 816 the sequencer 500 sends control signals to the power setting and power control devices on the RFIC 402, which causes the power setting and control devices to ramp-up the power according to the ramping profile information. This step may be triggered by a separate master command signal received from the baseband processor 406, or, alternatively, it may be controlled based on power control information already available in the sequencer memory 438. To ensure that ramping of power of the various PA stages is initiated at the appropriate times, the sequencer timer unit 504 may also be employed.

After the power ramping process in step 816 has completed, at step 818 the RFIC 402 sends the modulated RF carrier signal to the PA 410, which amplifies the signal and radiates it, via the antenna 412, to a remote receiver.

Finally, once the data has been transmitted, at step 820 the sequencer 500 sends ramp-down power control signals to the power setting and power control devices on the RFIC 402. The power setting and control devices cause the power to ramp-down, after which the sequencer 500 returns to its idle state in wait for a subsequent tuning command.

Although preferred embodiments of the present invention have been described in detail, it should be understood that various changes, substitutions and alternations can be made without departing from the spirit and scope of the inventions as defined by the appended claims.

What is claimed is:

1. A wireless communications apparatus, comprising:
   a baseband processor;
   an integrated circuit including RF generating circuitry including frequency determining devices and a programmable event controller; and
   a memory device coupled to said programmable event controller, said memory device configured to store instructions executable by said programmable event controller and control parameter data fetched by said programmable event controller to configure operational characteristics of said RF generating circuitry, wherein said instructions include directions for applying band parameters to a voltage controlled oscillator (VCO) and sending a tuning command for tuning the VCO and further directions for directing the programmable event controller to calibrate the frequency determining devices of the RF generating circuitry.

2. The wireless communications apparatus of claim 1 wherein the integrated circuit is an integrated circuit chip and the memory device is integrated in the same integrated circuit chip as are the RF generating circuitry and programmable event controller, and wherein said baseband processor is not integrated on said integrated circuit.

3. The wireless communications apparatus of claim 2, further comprising a nonvolatile storage device coupled to said baseband processor, said nonvolatile storage device configured to store a plurality of different sets of instructions and band information for different regions of the world, one or more sets of which are downloadable to said memory device on said integrated circuit chip.

4. The wireless communications apparatus of claim 1 wherein the wireless communications apparatus comprises a multi-mode wireless communications apparatus configurable for operation according to multiple wireless schemes and said integrated circuit includes a plurality of modulators which the programmable event controller is operable to select from to accommodate the multiple wireless schemes.

5. The wireless communications apparatus of claim 1 wherein said programmable event controller is configured to execute instructions from said memory device that provide frequency control parameters for the frequency determining devices.

6. The wireless communications apparatus of claim 1 wherein said integrated circuit further includes power control devices and said programmable event controller is configured to execute instructions from said memory device that provide power control parameters for the power control devices.

7. The wireless communications apparatus of claim 6 wherein said power control devices include digital circuitry and the power control parameters provided by the programmable event controller comprise digital control parameters.

8. The wireless communications apparatus of claim 1 wherein said programmable event controller comprises a sequencer and said instructions comprise a predetermined sequence of instructions executable by the sequencer.

9. The wireless communications apparatus of claim 1 wherein said RF generating circuitry forms part of a polar modulator integrated in said integrated circuit.

10. The wireless communication apparatus of claim 1 wherein said instructions include directions for directing the programmable event controller to calibrate the phase-locked loop and/or gain of a VCO.

11. The wireless communication apparatus of claim 1 wherein said instructions include directions for directing the programmable event controller to calibrate feedback loops in subsystems on said integrated circuit.

12. An integrated circuit for a wireless communication system, comprising:
    RF generating circuitry including frequency determining devices;
    a programmable event controller coupled to said RF generating circuitry operable to control operational characteristics of said RF generating circuitry; and
    a memory configured to store instructions executable by said programmable event controller, said instructions directing said programmable event controller on how to control the operational characteristics of said RF generating circuitry, and configured to store control parameter data fetched by said programmable event controller to configure operational characteristics of said RF generating circuitry, wherein said instructions include directions for applying band parameters to a voltage controlled oscillator (VCO) and sending a tuning command for tuning the VCO and further directions for directing the programmable event controller to calibrate the frequency determining devices of the RF generating circuitry.

13. The integrated circuit of claim 12 wherein said RF generating circuitry comprises RF generating circuitry of a polar modulation transmitter.

14. The integrated circuit of claim 12 wherein said RF generating circuitry comprises RF generating circuitry of a multi-mode transmitter configurable by said programmable event controller to transmit according to various frequency bands or various wireless schemes.

15. The integrated circuit of claim 12 wherein said instructions include instructions for directing the programmable event controller to change a power control setting of a power amplifier coupled to the RF generating circuitry.

16. The integrated circuit of claim 15 wherein said power control settings comprise power ramping information.

17. The integrated circuit of claim 12 wherein said instructions include instructions for directing the programmable event controller to provide a frequency control parameter to the RF generating circuitry.

18. The integrated circuit of claim 12 wherein said programmable event controller comprises a sequencer and said instructions comprise a predetermined sequence of instructions executable by the sequencer.

19. The integrated circuit of claim 12 wherein said instructions include directions for directing the programmable event controller to calibrate the phase-locked loop and/or gain of a VCO.

20. The integrated circuit of claim 12 wherein said instructions include directions for directing the programmable event controller to calibrate feedback loops in subsystems on said integrated circuit.

21. An integrated circuit for a wireless communication system, comprising:
RF generating circuitry;
power setting devices;
a programmable event controller coupled to said RF generating circuitry operable to control operational characteristics of said RF generating circuitry; and
a memory configured to store instructions executable by said programmable event controller, said instructions directing said programmable event controller on how to control the operational characteristics of said RF generating circuitry, and configured to store control parameter data fetched by said programmable event controller to configure the operational characteristics of the RF generating circuitry, wherein said instructions include directions for sending ON/OFF and power control parameters to a power controller and directions for directing the programmable event controller to calibrate the power setting devices formed in the integrated circuit.

22. The integrated circuit of claim 21 wherein said instructions include directions for directing the programmable event controller to calibrate D/A converters.

23. A method of controlling operational characteristics of a wireless communications device, comprising:
on a first integrated circuit receiving a command or signal from a second integrated circuit;
retrieving frequency setting data, the frequency setting data corresponding to a frequency specified in said command or signal from a memory embedded in said first integrated circuit;
generating a frequency setting parameter from the frequency setting data retrieved from the memory;
coupling the frequency setting parameter to a frequency determining device on said first integrated circuit, retrieving power calibration data from the memory;
generating a power calibration parameter from the power calibration data retrieved from the memory; and
coupling the power calibration parameter to a power calibrating device on said first integrated circuit.

24. The method of claim 23, further comprising:
retrieving power control data from the memory;
generating a power control parameter from the power control data retrieved from the memory; and
coupling the power control parameter to a power control device on said first integrated circuit.

25. The method of claim 24 wherein coupling the power control parameter to the power control device on said first integrated circuit and/or on a second integrated circuit further comprises using the power control parameter to change a power output of a polar modulator power amplifier.

26. The method of claim 23 wherein coupling the frequency setting parameter to a frequency determining device on said first integrated circuit further comprises using the frequency setting parameter to change a frequency output of a frequency determining device configured within a phase path of a polar modulator.

27. A method of controlling operational characteristics of a wireless communications device, comprising:
on a first integrated circuit, receiving a command or signal from a second integrated circuit;
retrieving frequency setting data, the frequency setting data corresponding to a frequency specified in said command or signal from a memory embedded in said first integrated circuit;
generating a frequency setting parameter from the frequency setting data retrieved from the memory;
coupling the frequency setting parameter to a frequency determining device on said first integrated circuit;
retrieving frequency calibration data from the memory;
generating a frequency calibration parameter from the frequency calibration data retrieved from the memory; and
coupling the frequency calibration parameter to a frequency calibrating device on said first integrated circuit.

28. A wireless communications apparatus, comprising:
a baseband processor;
an integrated circuit including RF generating circuitry including power setting devices and a programmable event controller; and
a memory device coupled to said programmable event controller, said memory device configured to store instructions executable by said programmable event controller and control parameter data fetched by said programmable event controller to configure operational characteristics of said RF generating circuitry, wherein said instructions include directions for sending ON/OFF and power control parameters to a power controller and directions for directing the programmable event controller to calibrate the power setting devices formed in the integrated circuit.

29. The wireless communication apparatus of claim 28 wherein said instructions include directions for directing the programmable event controller to calibrate D/A converters.

30. A wireless communications apparatus, comprising:
an integrated circuit having a frequency determining device and a power setting device, the integrated circuit configured to receive a command or signal from another integrated circuit;
a memory embedded in the integrated circuit, the memory storing frequency setting data corresponding to a frequency specified in the command or signal and further storing power calibration data; and
a processor coupled to the integrated circuit, the processor configured to:
retrieve frequency setting data from the memory,
generate a frequency setting parameter from the frequency setting data retrieved from the memory,
couple the frequency setting parameter to the frequency determining device on the integrated circuit,
retrieve the power calibration data from the memory,
generate a power calibration parameter from the power calibration data retrieved from the memory, and
couple the power calibration parameter to the power calibrating device on the integrated circuit.

31. A wireless communications apparatus, comprising:
an integrated circuit having a frequency determining device and a frequency calibrating device, the integrated circuit configured to receive a command or signal from another integrated circuit;
a memory embedded in the integrated circuit, the memory storing frequency setting data corresponding to a frequency specified in the command or signal and further storing frequency calibration data; and a processor coupled to the integrated circuit, the processor configured to:
    retrieve frequency setting data from the memory,
    generate a frequency setting parameter from the frequency setting data retrieved from the memory,
    couple the frequency setting parameter to the frequency determining device on the integrated circuit,
    retrieve the frequency calibrating data from the memory,
    generate a frequency calibration parameter from the frequency calibration data retrieved from the memory, and
    couple the frequency calibration parameter to the frequency calibrating device on the integrated circuit.

* * * * *